(12) United States Patent
Flores Penalba et al.

(10) Patent No.: US 11,866,547 B2
(45) Date of Patent: Jan. 9, 2024

(54) METHOD FOR PRODUCING FUNCTIONALIZED POLYESTERS

(71) Applicant: Henkel AG & Co. KGaA, Duesseldorf (DE)

(72) Inventors: Sonia Flores Penalba, Cerdanyola del Valles (ES); Miguel Paradas-Palomo, Mollet del Valles (ES); Jose Garcia Miralles, Duesseldorf (DE); Hans-Georg Kinzelmann, Pulheim (DE); Rosa Maria Sebastian Perez, Ripollet (ES); Jordi Marquet Cortes, Barcelona (ES); Jorge Aguilera Corrochano, Barcelona (ES); Federica Arioli, Barcelona (ES); Therese Hemery, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 526 days.

(21) Appl. No.: 16/738,016

(22) Filed: Jan. 9, 2020

(65) Prior Publication Data

US 2020/0140609 A1    May 7, 2020

Related U.S. Application Data

(63) Continuation of application No. PCT/EP2018/063284, filed on May 22, 2018.

(30) Foreign Application Priority Data

Jul. 11, 2017    (EP) .................................. 17382454

(51) Int. Cl.
*C08G 63/685*    (2006.01)
*C09D 167/04*    (2006.01)
(Continued)

(52) U.S. Cl.
CPC ....... *C08G 63/912* (2013.01); *C08G 63/6852* (2013.01); *C09D 167/04* (2013.01);
(Continued)

(58) Field of Classification Search
None
See application file for complete search history.

(56) References Cited

U.S. PATENT DOCUMENTS 3,169,945 A * 2/1965 Young .................. C08G 63/823
                                                        524/223
3,284,417 A * 11/1966 Hostettler .............. C08G 63/08
                                                        528/357
(Continued)

FOREIGN PATENT DOCUMENTS

CN    101056912 A    10/2007
CN    104053695 A     9/2014
(Continued)

OTHER PUBLICATIONS

Deutsche (DGF) Einheitsmethoden zur Untersuchung von Fetten, Fettprodukten, Tensiden und verwandten Stoffen (Gesamtinhaltsverzeichnis 2016) C-V 17b (53).
(Continued)

*Primary Examiner* — Vivian Chen
(74) *Attorney, Agent, or Firm* — James E. Piotrowski (57) ABSTRACT

The present application is directed to a method for preparing an amino-functional polyester, said method comprising: providing a mixture comprising at least one lactone monomer, a catalyst and a polyamine having at least one primary and at least one secondary amine group; and, subjecting said mixture to ring-opening polymerization conditions.

15 Claims, 2 Drawing Sheets (51) Int. Cl.
| | |
|---|---|
| *C09J 167/04* | (2006.01) |
| *C08K 5/3477* | (2006.01) |
| *C08K 5/3442* | (2006.01) |
| *C08K 5/17* | (2006.01) |
| *C08G 63/68* | (2006.01) |
| *C08K 5/29* | (2006.01) |
| *C08L 67/04* | (2006.01) |
| *C08K 5/3467* | (2006.01) |
| *C08K 5/3462* | (2006.01) |
| *C08G 63/08* | (2006.01) |
| *C08G 63/91* | (2006.01) |

(52) U.S. Cl.
CPC ............ *C09J 167/04* (2013.01); *C08G 63/08* (2013.01); *C08G 63/68* (2013.01); *C08G 63/685* (2013.01); *C08K 5/17* (2013.01); *C08K 5/29* (2013.01); *C08K 5/3442* (2013.01); *C08K 5/3462* (2013.01); *C08K 5/3467* (2013.01); *C08K 5/3477* (2013.01); *C08L 67/04* (2013.01)

(56) References Cited

U.S. PATENT DOCUMENTS

| | | | |
|---|---|---|---|
| 3,294,743 A | 12/1966 | Mack | |
| 3,535,342 A | 10/1970 | Emmons | |
| 4,379,914 A | 4/1983 | Lundberg | |
| 4,379,915 A * | 4/1983 | Watanabe | C08G 18/4277 528/357 |
| 4,447,591 A * | 5/1984 | Watanabe | C08G 63/08 528/80 |
| 4,463,168 A | 7/1984 | Lundberg | |
| 4,512,776 A | 4/1985 | Lundberg | |
| 4,835,289 A | 5/1989 | Brindoepke | |
| 4,892,954 A | 1/1990 | Brindoepke et al. | |
| 5,028,667 A | 7/1991 | McLain et al. | |
| 6,077,884 A | 6/2000 | Hess et al. | |
| 6,255,445 B1 * | 7/2001 | Dutton | C08G 63/08 528/495 |
| 8,067,093 B2 | 11/2011 | Nixon et al. | |
| 9,598,618 B2 | 3/2017 | Pritschins et al. | |
| 10,640,611 B2 | 5/2020 | Goebelt et al. | |
| 2008/0033138 A1 | 2/2008 | Carr et al. | |
| 2010/0174046 A1 | 7/2010 | Liu et al. | |
| 2010/0179282 A1 * | 7/2010 | Spyrou | C08G 63/6856 525/437 |
| 2012/0202966 A1 | 8/2012 | Spyrou et al. | |
| 2013/0317121 A1 | 11/2013 | Bourissou et al. | |
| 2016/0122539 A1 * | 5/2016 | Okamoto | C09D 7/65 521/137 |
| 2017/0190840 A1 * | 7/2017 | Göbelt | C08G 63/6852 |
| 2019/0194390 A1 * | 6/2019 | Capasso Palmiero | C07D 471/04 |
| 2019/0316013 A1 * | 10/2019 | Tang | C08G 18/724 |
| 2020/0062894 A1 * | 2/2020 | Paradas-Palomo | C08G 63/78 |

FOREIGN PATENT DOCUMENTS

| | | | |
|---|---|---|---|
| CN | 106905909 A | | 6/2017 |
| CN | 111032730 A | * | 4/2020 |
| EA | 017087 B1 | | 9/2012 |
| EP | 0119840 A1 | | 9/1984 |
| GB | 1485925 A | | 9/1977 |
| JP | H0297553 A | | 4/1990 |
| JP | H0725993 A | | 1/1995 |
| JP | 08-059800 A | * | 3/1996 |
| JP | 2001279168 A | | 10/2001 |
| JP | 2011208115 A | | 10/2011 |
| KR | 2020-0038967 A | * | 4/2020 |
| WO | 2015079033 A1 | | 6/2015 |

OTHER PUBLICATIONS

Macromolecules, 1992, 25, 2614-2618.
Sullivan et al. (Ed.) Clinical Environmental Health and Toxic Exposures 2nd Edition (2001) and Tarvainen et al. Journal of Environmental Medicine (1999) 1.1.3.
ASTM D2572-91 (undated).
Starcher et al. in the Journal of the American Chemical Society, 80, 4079 (1958).
Ring Opening Polymerization, vol. I, pp. 461-521, K. J. Ivin and T. Saegusa (1984).
International Search Report for International PCT Patent Application No. PCT/EP2018/063284 dated Jul. 25, 2018.
Qing Cai et al., "Synthesis and Properties of Star-Shaped Polylactide attached to Poly(Amidoamine) Dendrimer," Biomacromolecules, vol. 4, No. 3, May 2003, pp. 828-834.
Andrew P. Dove, "Organic Catalysis for Ring-Opening Polymerization," ACS Macro Letters, vol. 1, No. 12, Dec. 2012, pp. 1409-1412.
Xu Rong et al., Ring-Opening Polymerization of e-Caprolactone Catalyzed by Organocatalyst, Progress in Chemistry, vol. 24, No. 8, Aug. 2012, pp. 1519-1525.
Rieger B. et al., Synthetic Biodegradable Polymers, Advances in Polymer Science 245, Springer, Sep. 21, 2011, pp. 179-199.
Ying He et al., Coating Resin Chemistry, p. 384, Chemical Industry Press Co., Ltd., Aug. 2007.

* cited by examiner

METHOD FOR PRODUCING FUNCTIONALIZED POLYESTERS

FIELD OF THE INVENTION

The present application is directed to a method for producing functionalized polyesters. More particularly, the application is directed to method for producing amino- and hydroxyl-functionalized polyesters and to the use of said polyesters in coating, adhesive or sealant compositions.

BACKGROUND TO THE INVENTION

Diamines, triamines and higher functionality polyamines are versatile and commonly used curatives that can react with a variety of polymeric or resinous systems: for illustrative purposes only compositions based on epoxy resins, polyisocyanates and cyclic carbonates can be cured with polyamines. Problematically, however, most low molecular aliphatic polyamines are volatile, possess limited supplementary functionalization and provide only limited contribution to the mechanical properties of the cured systems. Further, such low molecular weight polyamines present numerous health hazards—such as acute toxicity, irritation and dermal and pulmonary sensitization—as mentioned in Sullivan et al. (Ed.) *Clinical Environmental Health and Toxic Exposures* $2^{nd}$ Edition (2001) and Tarvainen et al. *Journal of Environmental Medicine* (1999) 1.1.3.

The present invention is concerned with the development of polymeric amino-curatives which possess a polyester backbone, which are stable and non-volatile, and which can contribute to the mechanical properties of the final curable composition. In developing higher molecular weight amino-curatives, the present invention seeks to mitigate those environmental health concerns related to the migration and diffusion of amines in fluid systems.

U.S. Pat. No. 4,379,914 (Lundberg) describes process for the formation of polylactone polymers which are terminated on one end by a tertiary amine group and on the other end by a hydroxyl group. In the synthesis thereof an epsilon-caprolactone is reacted with a diamine in the presence of a catalyst of stannous octanoate: the diamine is characterized in that one of the amine groups thereof is tertiary and the other amine group is either primary or secondary. The polylactone polymers of this citation do not possess reactive amino groups. And analogous polylactone polymers are further disclosed in U.S. Pat. Nos. 4,463,168 and 4,512,776 (also to Lundberg).

The formation of a polyester by ring-opening polymerization of inter alia ε-caprolactone is also discussed in *Macromolecules*, 1992, 25, 2614-2618, wherein diethylaluminium alkoxide and a triethylaluminium-amine system are used as the initiator. The polymerization reaction is terminated by acid hydrolysis. And following this mechanism, the derived polyester does not possess any amino groups since the amine introduced by the initiator reacts to form an amide.

US 20100179282A1 (Evonik Degussa) describes polyesters which have been modified with one or more polyamines having at least one primary and at least one secondary amino group. This citation reports the synthesis of storage-stable polyesters having reactive secondary amino groups. Specifically, the synthesis is carried out through an aminolysis reaction of the polyester polyols with the polyamines: the amine group attacks the carbonyl group of the ester forming an amide bond and releasing a glycol or an oligoester. As such, side-products containing no amino groups are also released during the reaction, leading to a complex mixture of glycols, oligoesters and amino-polyester chains with a broad distribution of molecular weight.

STATEMENT OF THE INVENTION

In accordance with a first aspect of the present invention, there is provided a method for preparing an amino-functional polyester, said method comprising:
a. providing a mixture comprising at least one lactone monomer, a catalyst and a polyamine having at least one primary and at least one secondary amine group; and,
b. subjecting said mixture to ring-opening polymerization conditions.

The polyamine here acts as the initiator in the ring-opening polymerization reaction. By virtue of the polyamine possessing two amine groups of different reactivity, the initiator is incorporated into the polyester structure with the residue thereof retaining secondary amine groups. As a consequence of the mechanism of ring-opening polymerization, the polyesters obtained in accordance with the present invention are further characterized by having at least one terminal hydroxyl group.

In an embodiment of the invention, the reactive mixture comprises, based on the total weight of monomers: from 80 to 100 wt. % of said at least one lactone monomer; and, from 0 to 20 wt. % of at least one co-monomer selected from the group consisting of: epoxide compounds; cyclic carbonates; glycolide; and, lactide.

Irrespective of the presence or absence of such co-monomers, it is preferred that said reactive mixture comprises at least one lactone monomer conforming to Formula (1):

Formula (1)

wherein: n≥1;
i. each R is independently selected from the group consisting of hydrogen, C1-C6 alkyl, C3-C8 cycloalkyl, C1-C6 alkoxy and C6 aryl with the proviso that at least n R's are hydrogen.

More particularly, the reaction mixture should comprise at least one lactone monomer conforming to Formula (1a):

Formula (1a)

wherein: n is an integer of from 1 to 4; and,
i. each R is independently selected from the group consisting of hydrogen and C1-C6 alkyl, with the proviso that at least n+2 R's are hydrogen.

The recited polyamine initiator may be aliphatic, cycloaliphatic, aromatic and/or heterocyclic. A preference for aliphatic and/or cycloaliphatic polyamines might be mentioned however. And a preference also exists for polyamines containing at least two primary amine groups and at least one secondary amine group. For example, highly suitable polyamine initiators may be characterized by having at least two primary amine groups and at least one secondary amine group.

The ring-opening polymerization catalyst is typically provided in an amount of from 0.1 to 5 wt. %, and preferably in an amount of from 0.1 to 2.0 wt. %, based on the total weight of monomers. In preferred embodiments, the provided catalyst is tin (Sn) free or even metal-free: the use of 1,5,7-triazabicyclo[4.4.0]dec-5-ene (TBD) and/or 1,8-diazabicyclo-(5,4,0)-undecene-7 (DBU) has proved effective, for instance.

In accordance with a second aspect of the present invention, there is provided an amino-functional polyester obtained by the method defined herein above and in the appended claims, said polyester preferably being characterized by at least one of:
i) a weight average molecular weight (Mw) of from 300 to 5000 g/mol, preferably from 500 to 4000 g/mol;
ii) a polydispersity index of less than 2.5, preferably less than 2.3;
iii) an amine value (NHv) of from 20 to 350 mg KOH/g, preferably from 25 to 250 mg KOH/g; and,
iv) total hydroxyl and amine value (OHv+NHv) of from 40 to 500 mg KOH/g, preferably from 50 to 400 mg KOH/g.

In accordance with a third aspect of the present invention, there is provided a curable coating, adhesive or sealant composition comprising: an amino-functional polyester as defined herein above and in the appended claims; and, at least one multifunctional compound (H) having at least two functional groups (F) selected from the group consisting of: epoxy groups; isocyanate groups; and cyclic carbonate groups.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The terms "preferred", "preferably", "desirably", "in particular" and "particularly" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

The molecular weights given in the present text refer to weight average molecular weights (Mw), unless otherwise stipulated. All molecular weight data refer to values obtained by gel permeation chromatography (GPC), unless otherwise stipulated.

As used herein, "polydispersity index" refers to a measure of the distribution of molecular mass in a given polymer sample. The polydispersity index is calculated by dividing the weight average molecular weight (Mw) by the number average molecular weight (Mn).

Unless otherwise stated, OH values given herein were obtained following *Deutsche (DGF) Einheitsmethoden zur Untersuchung von Fetten, Fettprodukten, Tensiden and verwandten Stoffen* (Gesamtinhaltsverzeichnis 2016) C-V 17b (53).

Unless otherwise stated, the amine values given were obtained by titration with 0.1 N hydrochloric acid—in accordance with ASTM D2572-91—and thereafter calculated back to mg KOH/g.

Having regard to the amino-functional polyesters, the total hydroxyl and amine value (OHv+NHv) was measured in an established manner, specifically wherein the hydroxyl and amine groups were reacted with an excess of acetic acid anhydride, and the resulting free acetic acid group was back titrated with KOH to assess the total millimolar amount of hydroxy and amine groups in 1 gram of sample. The amine value per se was assessed by titration with 0.1 N hydrochloric acid—in accordance with ASTM D2572-91—and thereafter calculated back to mg KOH/g. The hydroxyl value was calculated based on the determined amine value and the determined total amine and hydroxyl value.

As used herein, room temperature is 23° C. plus or minus 2° C.

As used herein, the term "equivalent (eq.)" relates, as is usual in chemical notation, to the relative number of reactive groups present in the reaction; the term "milliequivalent" (meq) is one thousandth ($10^{-3}$) of a chemical equivalent.

The term "equivalent weight" as used herein refers to the molecular weight divided by the number of a function concerned. As such, "epoxy equivalent weight" (EEW) means the weight of resin, in grams, that contains one equivalent of epoxy.

As used herein, the term "aromatic group" means a mono- or polynuclear aromatic hydrocarbon group.

As used herein, "alkyl group" refers to a monovalent group that is a radical of an alkane and includes straight-chain and branched organic groups, which groups may be substituted or unsubstituted. The term "alkylene group" refers to a divalent group that is a radical of an alkane and includes linear and branched organic groups, which groups may be substituted or substituted.

Specifically, as used herein, "$C_1$-$C_6$ alkyl" group refers to an alkyl group that contains 1 to 6 carbons atoms. Examples of alkyl groups include but are not limited to: methyl; ethyl; propyl; isopropyl; n-butyl; isobutyl; sec-butyl; tert-butyl; n-pentyl; and, n-hexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1 to 6 carbon atoms ($C_1$-$C_6$ alkyl)—for example unsubstituted alkyl groups containing from 1 to 4 carbon atoms ($C_1$-$C_4$ alkyl) or 1 or 2 carbon atoms ($C_1$-$C_2$ alkyl)—should be noted.

As used herein "C1-C6 alkoxy" refers to a C1-C6 alkyl group as defined above, which is attached to an oxygen atom. Examples thereof include the methoxy, ethoxy, propyloxy, isopropyloxy, butyloxy, isobutyloxy, secondary butyloxy, tertiary butyloxy, pentyloxy or hexyloxy groups.

As used herein, "C3-C8 cycloalkyl" refers to a saturated cyclic hydrocarbon having from 3-8 carbon atoms. Examples thereof include cyclopropyl, cyclobutyl, cyclopentyl or cyclohexyl.

As used herein, term an "aryl group" means a monocyclic or polycyclic-aromatic radical comprising carbon and hydrogen atoms. Herein an aryl group can be unsubstituted or can be substituted with one or two C1-C6 alkyl groups. Specifically, herein, the term "C6 aryl" means a monocyclic ring wherein the ring comprises 6 carbon atoms.

As used herein "lactone" or "lactone ring" refers to a cyclic ester which may nominally be considered as the condensation product of an alcohol group and a carboxylic acid group in the same molecule. Prefixes may indicate the ring size: beta-lactone (4-membered), gamma-lactone (5-membered), delta-lactone (6-membered ring). As is known in the art, lactones can be prepared by the reaction of peracetic acid with cyclic ketones: the disclosure of inter alia Starcher et al. in the Journal of the American Chemical Society, 80, 4079 (1958) may be instructive in this regard. Further, lactones which are sourced for and used as monomers in the present invention should have a purity of at least 98%, preferably 99%: it is particularly preferred that said lactone monomers be essentially free of impurities and essentially free of water.

As used herein "lactide" (CAS 4511-42-6 and 95-96-5) refers to the cyclic diester obtained by dehydration-condensation of two lactic acid molecules. It is noted that this diester exists as three optical isomers: L-lactide formed from two L-lactic acid molecules; D-lactide formed from two D-lactic acid molecules; and, meso-lactide formed from L-lactic acid and D-lactic acid. Where applicable, lactoyl units of a polyester copolymer may be derived from one, two or three of said isomers.

As used herein, polymerization conditions are those conditions that cause the at least one monomer to form a polymer, such as temperature, pressure, atmosphere, ratio of starting components used in the polymerization mixture, reaction time, or external stimuli of the polymerization mixture. The polymerization process can be carried out in bulk, or solution, or other conventional polymerization modes. The process is operated at any of the reaction conditions appropriate to the polymerization mechanism.

As used herein, the terms "ring-opening" and "ring-opening reaction" refer to the conversion of a cyclic monomer into its acyclic form. Further, as used herein, the term "ring-opening polymerization" refers to formation of a chain of a plurality of ring-opened cyclic monomers. Specifically, herein, the term ring opening polymerization is intended to encompass both: i) "ring-opening homopolymerization" of one lactone compound; and ii) "ring-opening copolymerization" of two or more different lactone compounds.

As used herein, "polyol" refers to any compound comprising two or more hydroxyl groups. The term thus encompasses diols, triols and compounds containing four or more —OH groups.

The term "epoxide compound" denotes monoepoxide compounds and polyepoxide compounds: it is intended to encompass epoxide functional prepolymers. The term "polyepoxide compound" is thus intended to denote epoxide compounds having at least two epoxy groups. Further, the term "diepoxide compound" is thus intended to denote epoxide compounds having two epoxy groups.

As used herein "polyisocyanate" means a compound comprising at least two —N=C=O functional groups, for example from 2 to 5 or from 2 to 4 —N=C=O functional groups. Suitable polyisocyanates include aliphatic, cycloaliphatic, aromatic and heterocyclic isocyanates, dimers and trimers thereof, and mixtures thereof.

Aliphatic and cycloaliphatic polyisocyanates can comprise from 6 to 100 carbon atoms linked in a straight chain or cyclized and having at least two isocyanate reactive groups. Examples of suitable aliphatic isocyanates include but are not limited to straight chain isocyanates such as ethylene diisocyanate, trimethylene diisocyanate, tetramethylene diisocyanate, 1,6-hexamethylene diisocyanate (HDI), octamethylene diisocyanate, nonamethylene diisocyanate, decamethylene diisocyanate, 1,6,11-undecanetriisocyanate, 1,3,6-hexamethylene triisocyanate, bis(isocyanatoethyl)-carbonate, and bis (isocyanatoethyl) ether. Exemplary cycloaliphatic polyisocyanates include, but are not limited to, dicyclohexylmethane 4,4'-diisocyanate ($H_{12}$MDI), 1-isocyanatomethyl-3-isocyanato-1,5,5-trimethyl-cyclohexane (isophorone diisocyanate, IPDI), cyclohexane 1,4-diisocyanate, hydrogenated xylylene diisocyanate ($H_6$XDI), 1-methyl-2,4-diisocyanato-cyclohexane, m- or p-tetramethylxylene diisocyanate (m-TMXDI, p-TMXDI) and dimer fatty acid diisocyanate.

The term "aromatic polyisocyanate" is used herein to describe organic isocyanates in which the isocyanate groups are directly attached to the ring(s) of a mono- or polynuclear aromatic hydrocarbon group. In turn the mono- or polynuclear aromatic hydrocarbon group means an essentially planar cyclic hydrocarbon moiety of conjugated double bonds, which may be a single ring or may include multiple condensed (fused) or covalently linked rings. The term aromatic also includes alkylaryl. Typically, the hydrocarbon (main) chain includes 5, 6, 7 or 8 main chain atoms in one cycle. Examples of such planar cyclic hydrocarbon moieties include, but are not limited to, cyclopentadienyl, phenyl, napthalenyl-, [10]annulenyl-(1,3,5,7,9-cyclodecapentaenyl-), [12]annulenyl-, [8]annulenyl-, phenalene (perinaphthene), 1,9-dihydropyrene, chrysene (1,2-benzophenanthrene). Examples of alkylaryl moieties are benzyl, phenethyl, 1-phenylpropyl, 2-phenylpropyl, 3-phenylpropyl, 1-naphthylpropyl, 2-naphthylpropyl, 3-naphthylpropyl and 3-naphthylbutyl.

Exemplary aromatic polyisocyanates include, but are not limited to: all isomers of toluene diisocyanate (TDI), either in the isomerically pure form or as a mixture of several isomers; naphthalene 1,5-diisocyanate; diphenylmethane 4,4'-diisocyanate (MDI); diphenylmethane 2,4'-diisocyanate and mixtures of diphenylmethane 4,4'-diisocyanate with the 2,4' isomer or mixtures thereof with oligomers of higher functionality (so-called crude MDI); xylylene diisocyanate (XDI); diphenyl-dimethylmethane 4,4'-diisocyanate; di- and tetraalkyl-diphenylmethane diisocyanates; dibenzyl 4,4'-diisocyanate; phenylene 1,3-diisocyanate; and, phenylene 1,4-diisocyanate.

It is noted that the term "polyisocyanate" is intended to encompass prepolymers formed by the partial reaction of the aforementioned aliphatic, cycloaliphatic, aromatic and heterocyclic isocyanates with polyols to give isocyanate functional oligomers, which oligomers may be used alone or in combination with free isocyanate(s).

For completeness: a) a primary amine group is an atomic grouping of the type "—$NH_2$" (R—H); (b) a secondary amine group is an atomic grouping of the type "—NHR"; and, c) a tertiary amine group is an atomic grouping of the type "—NR$_2$". An amino-functional polymer means a polymer possessing at least one amine group.

As used herein, the term "catalytic amount" means a sub-stoichiometric amount of catalyst relative to a reactant.

The term "essentially free" is intended to mean herein that the applicable group, compound, mixture or component constitutes less than 0.1 wt. %, based on the weight of the defined composition.

DETAILED DESCRIPTION OF THE INVENTION

As described herein before, the present invention provides a method for preparing an amino-functional polyester, said method comprising: providing a mixture comprising at least one lactone monomer, a catalyst and a polyamine having at least one primary and at least one secondary amine group; and, subjecting said mixture to ring-opening polymerization conditions.

There is no specific intention to limit the lactone compounds which may be used in the present invention as monomers, provided the compounds can undergo ring-opening polymerization in the presence of a catalyst. Generally, however, suitable lactone monomers will conform to the general Formula (1) herein below:

Formula (1)

wherein: n≥1;
i. each R is independently selected from the group consisting of hydrogen, C1-C6 alkyl, C3-C8 cycloalkyl, C1-C6 alkoxy and C6 aryl with the proviso that at least n R's are hydrogen.

Preferred lactone monomers conforming to Formula (1) are characterized by the limitations: n is an integer of from 1 to 4; and, each R is independently selected from the group consisting of hydrogen and C1-C6 alkyl, with the proviso that at least n+2 R's are hydrogen.

As exemplary lactone monomers, which may be used alone or in combination, may be mentioned: β-propiolactone; β-butyrolactone; β-valerolactone; γ-butyrolactone; γ-valerolactone; δ-valerolactone; monomethyl-δ-valerolactone; monoethyl-δ-valerolactone; monohexyl-δ-valerolactone; ε-caprolactone; monomethyl-ε-caprolactone; monoethyl-ε-caprolactone; monohexyl-ε-caprolactone; dimethyl-ε-caprolactone; di-n-propyl-ε-caprolactone; di-n-hexyl-ε-caprolactone; trimethyl-ε-caprolactone; triethyl-ε-caprolactone; pivalolactone; and, 5-methyloxepan-2-one.

In addition to the aforementioned lactones, further co-monomers may be included in the polymerization mixture in an amount up to 20 wt. %, based on the total weight of monomers. When present said co-monomers should desirably be selected from the group consisting of: epoxide compounds, such as glycidyl ethers, monoepoxides of dienes and polyenes, glycidyl esters and alkylene oxides; cyclic carbonates; glycolide; lactide; and, combinations thereof.

Non-limiting examples of suitable epoxide compounds which may be used as co-monomers include: ethylene oxide; propylene oxide; butylene oxide; 3,4-epoxy-1-pentene; styrene oxide; vinyl glycidyl ether; isopropenyl glycidyl ether; butadiene monoxide; and, phenyl glycidyl ether. A preference for ethylene oxide and/or propylene oxide might be mentioned.

Non-limiting examples of suitable cyclic carbonates include those represented by:

wherein: f and g are integers of from 1 to 3;
i. $R^1$, $R^2$, $R^3$ and $R^4$ are independently selected for each carbon unit (i.e., for each $(C)_f$ and $(C)_g$ unit) from hydrogen, C1-C6 alkyl, C6-aryl or —OC$_6$H$_5$;
ii. h is 0 or 1; and,
iii. E is —O—.

As specific examples of suitable cyclic carbonate co-monomers may be mentioned: trimethylene carbonate (TMC); tetramethylene carbonate (TEMC); pentamethylene carbonate (PMC); and, 1,2-propanediol carbonate.

The ring opening polymerization of the present invention involves the use, as an initiator, of a polyamine having: at least one and preferably at least two primary amine groups; and, at least one secondary amine group. In principle, all polyamines which meet this condition of possessing such amine groups of different reactivity are suitable. The polyamine initiator may be aliphatic, cycloaliphatic, aromatic and/or heterocyclic. A preference for aliphatic and/or cycloaliphatic polyamines might be mentioned, however.

Without intention to limit the present invention, exemplary polyamines containing at least one primary and at least one secondary amino group include: N-methylethylenediamine; N-ethylethylenediamine; N-propylethylenediamine; N-butylethylenediamine; N-benzylethylenediamine; N-phenylethylenediamine; N-methylpropylenediamine; N-ethylpropylenediamine; N-propylpropylenediamine; N-butylpropylenediamine; N-benzylpropylenediamine; N-phenylpropylenediamine; N-hydroxyethylethylenediamine; diethylenetriamine; triethylenetetramine; tetraethylenepentamine; pentaethylenehexamine; bishexamethylenetriamine; N-cyclohexylpropylenediamine; and, N-[3-(tridecyloxy)propyl]-1,3-propanediamine (Adogen 583).

It is here mentioned that a preference exists for aliphatic and/or cycloaliphatic polyamines, both in general and with regard to the above-mentioned list of exemplary polyamines.

The proportion of lactone monomer to initiator in the process may vary widely depending upon the particular properties desired in the polyester or in the products to be derived there from. Obviously where the polyester is to have substantially the properties of a product having a succession of lactone residues, the proportion of initiator to lactone may be very small, in as much as theoretically one molecule of initiator is sufficient to initiate the polymerization of an infinite number of lactone molecules. Conversely, and particularly where the initiator used is at least trifunctional and/or where it is desired that the polyester product be of a conjugated structure having a more or less alternating distribution of lactone residues, the relative proportions may be approximately equal.

The above acknowledged, the molar ratio of lactone monomers to said polyamine initiator will generally be in the range from 1:1 to 500:1, will preferably be in the range from 2:1 to 50:1 and will more preferably be in the range from 2:1 to 20:1.

As noted hereinbefore, the ring polymerization process of the present invention is performed in the presence of a suitable catalyst. An instructive reference on appropriate ionic or nonionic catalysts for the ring opening polymerization is *Ring Opening Polymerization*, Vol. I, pages 461-521, K. J. Ivin and T. Saegusa (1984). Known catalysts, which may be used alone or in combination, include but are not limited to: amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl) phenol, morpholine, N-methylmorpholine, 2-ethyl-4-methylimidazole, 1,5,7-triazabicyclo[4.4.0]dec-5-ene (TBD) and 1,8-diazabicyclo-(5,4,0)-undecene-7 (DBU); tin 2-ethylhexanoate (tin octanoate); tin dichloride ($SnCl_2$); porphyrin aluminum complexes; $(n-C_4H_9O)_4Al_2O_2Zn$; composite metal cyanide; aqueous diethylzinc or diethylcadmium; aluminum triisopropoxide; titanium tetrabutoxide; zirconium tetrapropoxide; tributyltin methoxide; tetraphenyltin; lead oxide; zinc stearate; bismuth 2-ethylhexanoate; potassium alcoholate; antimony fluoride; and yttrium or lanthanide series rare earth metal based catalysts (coordination catalysts), such as described in U.S. Pat. No. 5,028,667.

It is preferred herein that the catalyst is metal free. In particular, but without intention to limit the present invention, good results have been obtained where 1,5,7-triazabicyclo[4.4.0]dec-5-ene (TBD) and/or 1,8-diazabicyclo-(5,4,0)-undecene-7 (DBU) have been employed as the polymerization catalyst.

Whilst the determination of an appropriate catalytic amount of a compound is facile to a person of ordinary skill in the art, it is preferred that the polymerization catalyst be used in an amount of from 0.1 to 5 wt. %, for instance from 0.1 to 2.0 wt. %, based on the total weight of monomers.

The ring-opening polymerization reaction can be initiated at room temperature. The exothermic nature of reaction will naturally elevate the temperature of the reactants. That said, the reaction temperature should be maintained in the range from 50 to 200° C., or from 60 to 150° C. If the maintained temperature is lower than 50° C., the reaction rate may be unfavorably low. On the other hand, if the maintained temperature is higher than 200° C., the polymer degradation rate is increased and low-molecular weight components can form and even vaporize.

As is known in the art, the polymerization vessel may be dried and purged with an inert gas—such as nitrogen or argon—before initiating the ring-opening polymerization reaction. Moreover, to obviate the formation of a discolored polyester product, either a partial vacuum or an inert atmosphere may be maintained in the reaction vessel during the polymerization: by effecting such a partial vacuum or by passing nitrogen or argon through the reaction mixture, the presence of oxygen in the reaction vessel can be precluded or minimized.

The polymerization may be performed either in solution or in the melt without a solvent but in either case the vessel should be equipped with an effective stirrer, such as a mechanical stirrer: it has been observed that good stirring can drive the polymerization reaction to completion.

It is preferred herein for the polymerization mixture to be essentially free of solvents: for completeness, this statement of preference includes the polymerization mixture being essentially free of water. However, if one elects to perform the polymerization in solution, suitable solvents should be non-reactive, essentially anhydrous, organic liquids capable of dissolving at least 1 wt. % and preferably over 10 wt. % of the amino functional polyester products at 25° C. And as suitable organic solvents there can be mentioned: aromatic hydrocarbons, such as toluene and xylene; aliphatic hydrocarbons, such as heptane and decane; alicyclic hydrocarbons, such as cyclohexane and Decalin; chlorinated hydrocarbons such as chloroform and trichloroethylene; esters, such as ethyl acetate and methyl butyrate; and, ethers, such as tetrahydrofuran (THF) and dioxane.

The progress of the polymerization reaction can be monitored by Nuclear Magnetic Resonance (NMR) spectroscopy, with reaction completion being deemed to occur when signals associated with the initial lactones disappear completely. Depending upon the lactone monomer, it is considered that the reaction progress might also be monitored by: refractive index measurements, wherein the reaction may be regarded as complete as soon as the refractive index becomes constant; and, thermal analysis given that the reaction of the lactones promotes an exotherm such that the complete consumption of said lactones corresponds with the cooling down of the mixture. In any event, the polymerization reaction time will typically be from 0.1 to 10 hours, for example from 0.5 to 5 hours. If applicable and desired, a vacuum can be applied at an elevated temperature—such as from 120° to 160° C.—to remove any unreacted monomer.

Whilst this is not critical to its later application, the reaction product (hereinafter denoted as AF-PES) may be separated and purified using methods known in the art: mention in this regard may be made of extraction, evaporation, distillation and chromatography. Where it is intended that the (optionally purified) reaction product (AF-PES) be stored upon production, the polyesters should be disposed in a vessel with an airtight and moisture-tight seal.

The polyesters obtained in accordance with this process are characterized by having at least one terminal hydroxyl group. The initiator is incorporated into the polyester structure, which polyester is thus further characterized by having secondary amine groups.

In accordance with the preferred embodiments of the invention, the derived amino-functional polyester (AF-PES) is characterized by at least one of:

a weight average molecular weight of from 300 to 5000 g/mol, preferably from 500 to 4000 g/mol;

a polydispersity index of less than 2.5, preferably less than 2.3;

an amine value (NHv) of from 20 to 350 mg KOH/g, preferably from 25 to 250 mg KOH/g; and, a total hydroxyl and amine value (or alkaline value, OHv+NHv) of from 40 to 500 mg KOH/g, preferably from 50 to 400 mg KOH/g.

For completeness, it is noted that these limitations are not mutually exclusive and one, two, three or four of these characterizations may thus be applicable.

Coating, Sealant and Adhesive Compositions

The amino-functional polyesters (AF-PES) obtained using the process of the present invention can be employed as a reactive component of a curable coating, adhesive or sealant composition. The further reactant(s) of such compositions will generally be one or more multifunctional compounds (H) having at least two functional groups (F) selected from the group consisting of: (i) activated unsaturated groups, such as (meth)acryloyl groups; (ii) activated methylene groups, such as acetoacetate and malonate groups; (iii) epoxy groups; (iv) isocyanate groups; (v) aromatic activated aldehyde groups; (vi) cyclic carbonate groups; and, (vii) acid, anhydride and ester groups, including oxalate esters. Latent compounds, in which the functional groups (F) are blocked but which are activatable under specific physicochemical conditions, are also envisaged as suitable further reactants for the coating, adhesive or sealant compositions.

No particular limitation is imposed on the number of functional groups (F) possessed by the (activated) compound (H): compounds having 2, 3, 4, 5, 6, 7, 8, 9 or 10 functional groups may be used, for instance. Moreover, the reactant compound (H) can be a low-molecular-weight substance—that is its molecular weight is less than 500 g/mol—or an oligomeric or polymeric substance that has a number average molecular weight (Mn) above 500 g/mol. And, of course, mixtures of compounds (H) may be used.

In an embodiment of the coating, adhesive or sealant composition, the reactant compound (H) having at least two functional groups is selected from the group consisting of: polyepoxide compounds; cyclic carbonates; and, polyisocyanates. More particularly, the reactant compound (H) having at least two functional groups is selected from the group consisting of: polyepoxide compounds; and, cyclic carbonates.

Suitable polyepoxide compounds may be liquid, solid or in solution in solvent. Further, such polyepoxide compounds should have an epoxy equivalent weight of from 100 to 700 g/eq, for example from 120 to 320 g/eq. And generally, diepoxide compounds having epoxy equivalent weights of less than 500 or even less than 400 are preferred.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; diglycidyl o-phthalate, diglycidyl isophthalate and diglycidyl terephthalate; polyalkyleneglycol based diglycidyl ethers, in particular polypropyleneglycol diglycidyl ethers; and, polycarbonatediol based glycidyl ethers. Other suitable diepoxides which might also be mentioned include: diepoxides of double unsaturated fatty acid C1-C18 alkyl esters; butadiene diepoxide; polybutadiene diglycidyl ether; vinylcyclohexene diepoxide; and, limonene diepoxide.

Illustrative polyepoxide compounds include but are not limited to: glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

Without intention to limit the present invention, examples of highly preferred polyepoxide compounds for use as compound (H) include: bisphenol-A epoxy resins, such as DER™ 331, and DER™ 383; bisphenol-F epoxy resins, such as DER™ 354; bisphenol-A/F epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE; solutions of bisphenol-A solid epoxy resins, such as DER™ 671-X75; epoxy novolac resins, such as DEN™ 438; brominated epoxy resins such as DER™ 542; castor oil triglycidyl ether, such as ERISYS™ GE-35H; polyglycerol-3-polyglycidyl ether, such as ERISYS™ GE-38; and, sorbitol glycidyl ether, such as ERISYS™ GE-60.

As examples of suitable cyclic carbonate group-containing monomeric and oligomeric compounds may be mentioned: compounds produced by reacting hydroxyl-functional cyclocarbonates with a polyisocyanate; and, compounds produced by the addition of $CO_2$ to an epoxy group-containing monomer or oligomer. The disclosures of the following citations may be instructive in disclosing suitable cyclic carbonate functional compounds: U.S. Pat. Nos. 3,535,342; 4,835,289; 4,892,954; UK Patent No. GB-A-1,485,925; and, EP-A-0 119 840.

The total amount of compounds (H) present in the curable composition is preferably selected so that the molar ratio of amine groups of said functional polyesters (AF-PES) to the functional groups (F) is in the range of from 1:10 to 10:1, for example from 5:1 to 1:5, and is preferably in the range of from 1:2 to 2:1. For example, the molar ratio of amine groups of said functional polyesters (AF-PES) to either epoxy groups or cyclic carbonate groups in the hardening compound (H) may be from 1:2 to 3:2 or from 2:3 to 4:3.

In an alternative expression of the composition, the total amount of compounds (H) is suitably from 0.1-50 wt. %, preferably from 0.5 to 40 wt. % and more preferably 1 to 30 wt. %, based on the combined total amount of the amino-functional polyesters (AF-PES) and the compounds (H).

As is standard in the art, the curable composition may comprise additives and adjunct ingredients. Suitable additives and adjunct ingredients include: catalysts; antioxidants; UV absorbers/light stabilizers; metal deactivators; antistatic agents; reinforcers; fillers; antifogging agents; propellants; biocides; plasticizers; lubricants; emulsifiers; dyes; pigments; rheological agents; impact modifiers; adhesion regulators; optical brighteners; flame retardants; anti-drip agents; nucleating agents; wetting agents; thickeners; protective colloids; defoamers; tackifiers; solvents; reactive diluents; and, mixtures thereof. The selection of suitable conventional additives for the composition depends on the specific intended use thereof and can be determined in the individual case by the skilled artisan.

In certain embodiments of the invention, no catalysts will be required to catalyze the reaction of the cyclic amine groups with the functional groups (F) of the compound (H): this may typically be the case where cyclic carbonate groups or epoxy groups are present as the functional groups (F). However, in other cases and preferably where the compound (H) has reactive groups F that are different from said cyclic carbonate or epoxy groups, a catalyst may be required: suitable catalysts for the hardening will then be determined in a known manner dependent upon the type of the reactive functional groups (F). The catalysts, when desired, are used in an amount of from 0.01 to 10 wt. %, preferably from 0.01 to 5 wt. %, based on the total weight of the curable composition.

The curable coating, adhesive or sealant composition should comprise less than 5 wt. % of water, based on the weight of the composition, and is most preferably an anhydrous composition that is essentially free of water. These embodiments do not preclude the composition from either comprising organic solvent or being essentially free of organic solvent.

Broadly, all organic solvents known to the person skilled in the art can be used as a solvent but it is preferred that said organic solvents are selected from the group consisting of: esters; ketones; halogenated hydrocarbons; alkanes; alkenes; and, aromatic hydrocarbons. Exemplary solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether acetate, ethylene glycol monoethyl acetate, 2-ethylhexyl acetate, glycol diacetate, heptane, hexane, isobutyl acetate, isooctane, isopropyl acetate, methyl ethyl ketone, tetrahydrofuran or tetrachloroethylene or mixtures of two or more of the recited solvents.

Methods and Applications

To form a coating, sealant or adhesive composition, the reactive compounds are brought together and mixed in such a manner as to induce the hardening of the binder. More particularly, the amino-functional polyesters (AF-PES) and the compounds (H) may be mixed in pre-determined amounts by hand, by machine, by (co-)extrusion or by any other means which can ensure fine and highly homogeneous mixing thereof.

The hardening of the binder compositions of the invention typically occurs at temperatures in the range of from −10° C. to 150° C., preferably from 0° C. to 100° C., and in particular from 10° C. to 70° C. The temperature that is suitable depends on the specific compounds (H) and the desired hardening rate and can be determined in the individual case by the skilled artisan, using simple preliminary tests if necessary. Of course, hardening at temperatures of from 5° C. to 35° C. or from 20° C. to 30° C. is especially advantageous as it obviates the requirement to substantially heat or cool the mixture from the usually prevailing ambient temperature. Where applicable, however, the temperature of the mixture of the amino-functional polyesters (AF-PES) and the compounds (H) may be raised above the mixing temperature using conventional means, including microwave induction.

The compositions according to the invention may find utility inter alia in: varnishes; inks; elastomers; foams; binding agents for fibers and/or particles; the coating of glass; the coating of mineral building materials, such as lime- and/or cement-bonded plasters, gypsum-containing surfaces, fiber cement building materials and concrete; the coating and sealing of wood and wooden materials, such as chipboard, fiber board and paper; the coating of metallic surfaces; the coating of asphalt- and bitumen-containing pavements; the coating and sealing of various plastic surfaces; and, the coating of leather and textiles.

It is also considered that the compositions of the present invention are suitable as pourable sealing compounds for electrical building components such as cables, fiber optics, cover strips or plugs. The sealants may serve to protect those components against the ingress of water and other contaminants, against heat exposure, temperature fluctuation and thermal shock, and against mechanical damage.

By virtue of the fact that the compositions of the present invention are capable of creating a high binding strength in a short time, often at room temperature—particularly where epoxy or cyclic carbonate hardeners (H) are employed—the compositions are optimally used for forming composite structures by surface-to-surface bonding of the same or different materials to one another. The binding together of wood and wooden materials and the binding together of metallic materials, such as mild steel, may be mentioned as exemplary adhesive applications of the present compositions.

In a particularly preferred embodiment of the invention, the curable compositions are used as solvent-free or solvent-containing lamination adhesives for gluing plastic and polymeric films, such as polyolefin films, poly(methylmethacrylate) films, polycarbonate films and Acrylonitrile Butadiene Styrene (ABS) films.

In each of the above described applications, the compositions may applied by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray. For coating and adhesive applications, it is recommended that the compositions be applied to a wet film thickness of from 10 to 500 μm. The application of thinner layers within this range is more economical and provides for a reduced likelihood of thick cured regions that may—for coating applications—require sanding. However, great control must be exercised in applying thinner coatings or layers so as to avoid the formation of discontinuous cured films.

Various features and embodiments of the disclosure are described in the following examples, which are intended to be representative and not limiting.

EXAMPLES

The following materials and abbreviations are employed in the Examples:

TBD: Triazabicyclodecene

Bax: N-Cyclohexyl-1,3-propanediamine, available from TCI America.

CL: ε-Caprolactone.

VL: δ-Valerolactone.

TEPA: Tetraethylenepentamine, available from Sigma-Aldrich.

DETA: Diethylenetriamine.

BADGE: Bisphenol A diglycidyl ether, available from Tocris Bioscience.

CC-BADGE: Carbonated ($CO_2$) bisphenol A diglycidyl ether.

Erisys GE60: Sorbitol glycidyl ether, available from CVC Thermoset Specialties.

PEI: Polyethylenimine having a weight average molecular weight (Mw) of 800 g/mol, available from Sigma-Aldrich.

ARMS: As-received Mild Steel.

Example 1: Synthesis of Amino-functionalized Polyesters (NH-PES)

Amino-functionalized polyesters were formed using the following general procedure:

The amine was mixed with TBD (1 wt. % based on the total amount of lactone monomers) in an open beaker and mechanically stirred for 5 minutes. The lactones were weighed and mixed in a different container before they were added to the mixture of amine-TBD.

For the stoichiometry of the reaction, the functionality of diamines is considered as f=1 and the functionality of polyamines is considered as f=2.

The addition of the lactones promoted an exotherm that warmed up the reaction mixture (~60° C.); under good stirring, the reaction was brought to completion, leading to the desired amino-polyester. The reaction was monitored by NMR until the signals associated with the initial lactones disappeared completely—after approximately 2 hours—which corresponded with the cooling down of the mixture.

Example 1A: NH-PES 2A Using a Diamine

N-Cyclohexyl-1,3-propanediamine (1.56 g) and TBD (114 mg) were mixed for 5 minutes in a 50 mL flask with mechanical stirring. ε-caprolactone (11.4 g) was added to the amine-TBD mixture and was further stirred for 2 hours—with concomitant monitoring by 1H-NMR—to obtain an NH-PES with an amino value of 39 mg KOH/g.

Example 1B: NH-PES 2F Using a Polyamine

TEPA (18 g) and TBD (823 mg, 1 wt. % based on the total amount of lactone monomers) are mixed for 5 minutes in a 250 mL flask with mechanical stirring. A mixture of ε-caprolactone (43.8 g) and δ-valerolactone (38.5 g) are added to the amino-TBD mixture and stirred for 2 hours—under 1H-NMR monitoring—to obtain an NH-PES with amino value of 130 mg KOH/g.

Further examples, prepared using the same procedure, are detailed in Table 1 below.

TABLE 1

| NH-PES | Lactones (g) | | Amine (g) | | | TBD (mg) | Ratio Lactone:Amine | State of NH-PES | Amine Value (NHv, mg KOH/g) |
|---|---|---|---|---|---|---|---|---|---|
| | CL | VL | Bax | TEPA | DETA | | | | |
| 2A | 11.4 | | 1.56 | | | 114 | 10:1 | Solid | 39 |
| 2B | 24.0 | | | 10.0 | | 240 | 4:1 | Fluid | 210 |
| 2C | | 20.0 | | 12.6 | | 200 | 3:1 | Fluid | 228 |
| 2D | | 20.0 | | 9.47 | | 200 | 4:1 | Fluid | 206 |
| 2E | 18.3 | 15.9 | | 15.0 | | 341 | 2:2:1 | Fluid | 274 |
| 2F | 43.8 | 38.5 | | 18.0 | | 823 | 4:4:1 | Fluid | 130 |
| 2G | 43.8 | 38.5 | | 9.0 | | 823 | 8:8:1 | Fluid | 72 |
| 2H | 100.0 | | | | 22.6 | 1000 | 4:1 | Viscous paste | 136 |

Example 2

The molecular weight of four of the above mentioned amino functionalized polyesters (Table 1: 2B, 2D, 2F, 2G) was analyzed by gel permeation chromatography (GPC). Aliquots of each polyester were dissolved in tetrahydrofuran (THF) and the GPC analysis was performed, using THF as the solvent and poly(methylmethacrylate) (PMMA) as the analytical standard for calibration. The results of this analysis are shown in Table 2.

TABLE 2

GPC Analysis

| NH-PES | Weight Average Molecular Weight (Mw, g/mol) | Polydispersity Index |
|---|---|---|
| 2B | 627 | 1.77 |
| 2D | 336 | 1.04 |

TABLE 2-continued

| | GPC Analysis | |
|---|---|---|
| NH-PES | Weight Average Molecular Weight (Mw, g/mol) | Polydispersity Index |
| 2F | 1709 | 1.80 |
| 2G | 3125 | 2.16 |

Figure 1:
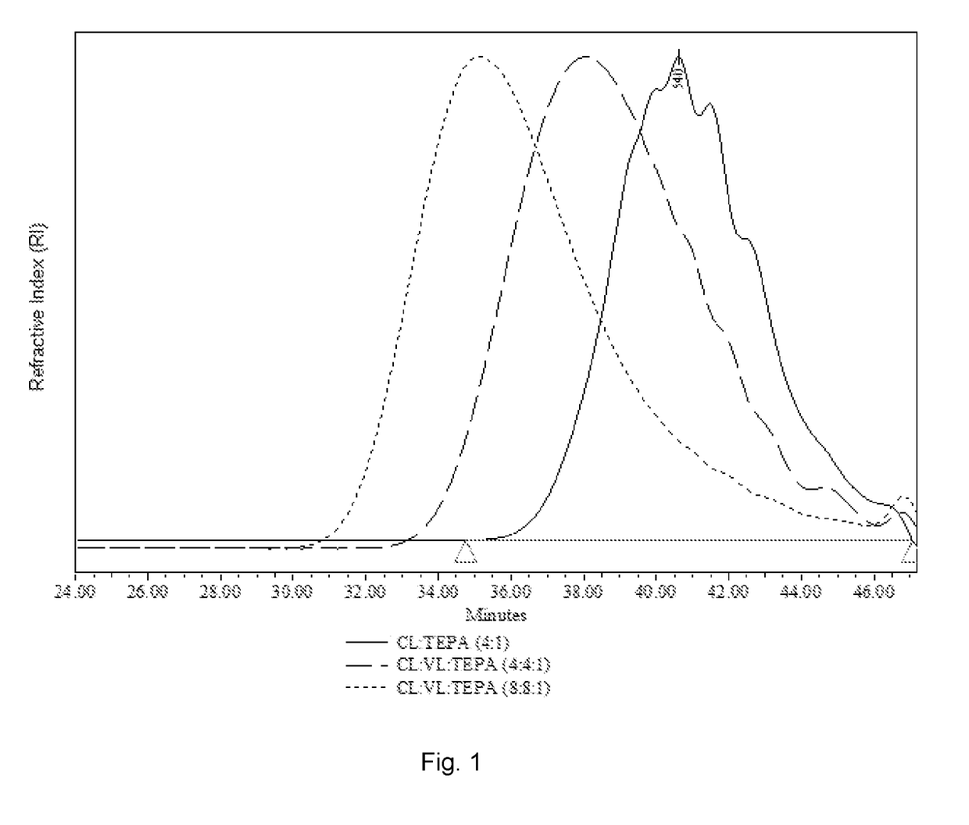
FIG. 1 appended hereto is a chromatogram obtained from the Gel Permeation Chromatographic (GPC) analysis of polyesters prepared in accordance with an embodiment of the present invention.

FIG. 1 appended hereto graphically represents the results of the chromatographic analysis of three of the amino-functional polyesters (2B, 2F, 2G) obtained in this Example, said graph depicting Refractive Index (RI) signal intensity versus elution time (minutes).

These tabulated and graphical results demonstrate that the ring-opening polymerization of the present invention provides a selective and controlled method for preparing amino-polyesters with a homogeneous distribution of molecular weights: no significant amounts of low molecular weight species are generated as a side product of the reaction mechanism.

Comparative Example 1

Polyesters were obtained by poly-condensing one or more dicarboxylic acids with one or more polyols: the acids and polyols are identified in Table 3 below. The respective condensations were conducted in an inert gas atmosphere at temperatures between 130° C. and 220° C. The obtained polyesters were then reacted with the identified polyamines—in the absence of solvent and under a nitrogen atmosphere—at temperatures between 90° C. and 130° C. over a duration of 1 to 8 hours. The products of the aminolysis reaction may be depicted as follows:

TABLE 3

| | Composition of Comparative Polyesters | | | |
|---|---|---|---|---|
| Comparative Example | Acid 1 | Acid 2 | Polyol | Amine |
| C1 | Sebacic acid | Isophthalic Acid | Dipropylene glycol | TEPA |
| C2 | Adipic acid | Isophthalic Acid | Tripropylene glycol | TEPA |
| C3 | Adipic acid | | Neopentyl glycol | TEPA |
| C4 | Adipic acid | | Dipropylene glycol | TEPA |

Figure 2:
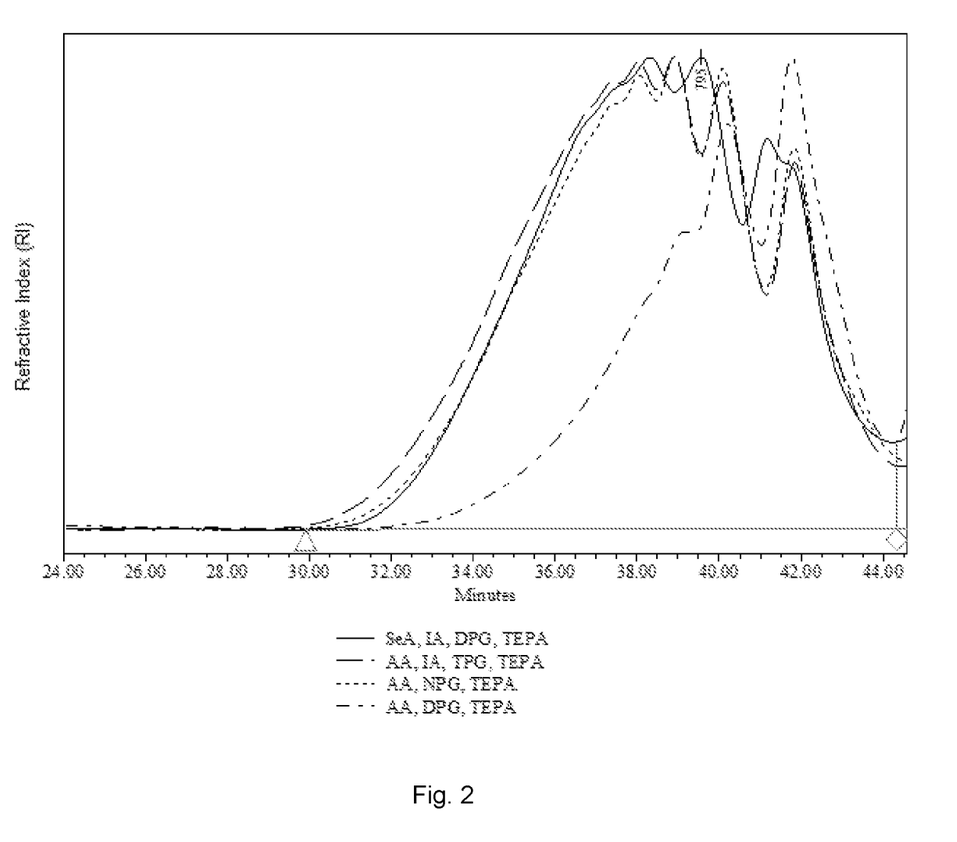
FIG. 2 appended hereto is a comparative chromatogram obtained from the Gel Permeation Chromatographic (GPC) analysis of polyesters prepared in accordance with the disclosure of US 20100179282A1 (Evonik Degussa).

FIG. 2 appended hereto graphically represents the results of the Gel Permeation Chromatographic (GPC) analysis of these aminolysis products, providing Refractive Index (RI) signal intensity versus elution time (minutes). It can be seen that all products obtained by aminolysis showed a heterogeneous molecular weight distribution with separated populations of molecules of different molecular weight. More particularly, one large and well-distinguished peak—of approximately 10% by area—is detected in all comparative examples and corresponds to monomeric glycols and/or oligoesters released as side products of the reaction.

It is submitted that these results indicate aminolysis of polyesters to be a non-selective and uncontrolled method for preparing amino-polyesters, which method leads to heterogeneous molecular weight distributions of products with significant amounts of low molecular weight species as a side product of the reaction mechanism. These observations would represent a drawback to the use of such amino-functional polyesters in those applications that require strict control on migration limits of non-reacted low-molecular weight species and of non-intentionally added substances (NIAS).

Example 3: Adhesion Performance of Adhesive Formulations

As shown in Table 4a herein below, four (4) adhesive formulations (AF1-AF4) were prepared by independently mixing two of the above defined amino functionalized polyesters (Table 1: NH2B, NH2F) with 40 mol. % polyethylenimine (MW 800) and then with an epoxy resin curing partner (BADGE; Erisys GE60). The mixtures were prepared at a ratio of [Epoxy groups]:[Primary and Secondary Amino groups] of 1:1 and were cured at either 100° C. or 80° C. for 2 hours.

TABLE 4a

| | Adhesive Formulations | | | |
|---|---|---|---|---|
| Adhesive Formulation | Identity of NH-PES | NH-PES with PEI (g) | BADGE (g) | Erisys GE 60 (g) |
| AF-1 | 2B | 1.245 | 1.255 | |
| AF-2 | 2B | 1.285 | | 1.215 |
| AF-3 | 2F | 1.603 | 0.897 | |
| AF-4 | 2F | 1.639 | | 0.861 |

Utilizing these adhesive formulations, lap shear tests were performed according to DIN EN 1465 and using the following substrates: ARMS-ARMS; Polycarbonate, PC-PC; ABS-ABS; and, Beech Wood-Beech Wood. The results of the tests performed at room temperature are shown in Table 4b herein below, wherein: SF means substrate failure; AF means adhesive failure; and, CF means cohesive failure.

TABLE 4b

| | Lap Shear Strength | | | | |
|---|---|---|---|---|---|
| Adhesive Formulation | Curing Conditions | ARMS (MPa) | Polycarbonate (MPa) | ABS (MPa) | Beech Wood (MPa) |
| AF-1 | 100° C., 2 hours for ARMS, polycarbonate and beech wood substrates. 80° C., 2 hours for ABS. | 14.49 AF | 1.42 CF | 1.42 AF | 13.85 SF |
| AF-2 | | 3.87 AF | 4.67 SF | 1.05 AF | 6.22 CF |
| AF-3 | | 7.12 AF | 3.36 AF | 0.90 AF | 4.46 CF |
| AF-4 | | 3.40 AF | 1.69 CF | 0.85 AF | 1.92 CF |

Example 4: Adhesion Performance of Adhesive Formulations

As shown in Table 5a herein below, two (2) adhesive formulations (AF5-AF6) were prepared by independently mixing two of the above defined amino functionalized polyesters (Table 1: NH2B, NH2F) with 40 mol. % polyethylenimine (MW 800) and then with a cyclic carbonate functional curing partner (CC-BADGE): said curing partner was obtained by the addition of $CO_2$ to the epoxide compound. The mixtures were prepared at a ratio of [Cyclic Carbonate groups]:[Primary and Secondary Amino groups] of 1:1 and were cured at 130° C. for 20 hours.

TABLE 5a

Adhesive Formulations

| Adhesive Formulation | Identity of NH-PES | NH-PES with PEI (g) | CC-BADGE (g) |
|---|---|---|---|
| AF-5 | 2B | 1.114 | 1.386 |
| AF-6 | 2F | 1.478 | 1.022 |

Utilizing these adhesive formulations, lap shear tests were performed according to DIN EN 1465 and using the following substrates: ARMS-ARMS; and, Beech Wood-Beech Wood. The results of the tests performed at room temperature are shown in Table 5b herein below, wherein: SF means substrate failure; AF means adhesive failure; CF means cohesive failure; and, NM means not measured.

TABLE 5b

Lap Shear Strength

| Adhesive Formulation | Curing Conditions | ARMS (MPa) | Beech Wood (MPa) |
|---|---|---|---|
| AF-5 | 130° C., 20 hours | 1.36 AF | 2.56 CF |
| AF-6 |  | 2.75 AF | NM |

The invention claimed is:

1. A method for preparing an amino-functional polyester, said method comprising:
providing a mixture comprising at least one lactone monomer, a catalyst and a polyamine having at least one primary and at least one secondary amine group; and,
subjecting said mixture to ring-opening polymerization conditions,
wherein the catalyst is 1,5,7-triazabicyclo[4.4.0]dec-5-ene (TBD), 1,8-diazabicyclo-(5,4,0)-undecene-7 (DBU) or both.

2. The method according to claim 1, wherein said mixture comprises at least one lactone monomer conforming to Formula (1):

Formula (1)

wherein: n≥1;
each R is independently selected from the group consisting of hydrogen, C1-C6 alkyl, C3-C8 cycloalkyl, C1-C6 alkoxy and C6 aryl with the proviso that at least n R's are hydrogen.

3. The method according to claim 2, wherein said mixture comprises at least one lactone monomer conforming to Formula (1a):

Formula (1a)

wherein: n is an integer of from 1 to 4; and,
each R is independently selected from the group consisting of hydrogen and C1-C6 alkyl, with the proviso that at least n+2 R's are hydrogen.

4. The method according to claim 1, wherein said mixture comprises at least one lactone monomer selected from the group consisting of: p-propiolactone; β-butyrolactone; β-valerolactone; γ-butyrolactone; γ-valerolactone; δ-valerolactone; monomethyl-δ-valerolactone; monoethyl-δ-valerolactone; monohexyl-δ-valerolactone; ε-caprolactone; monomethyl-ε-caprolactone; monoethyl-ε-caprolactone; monohexyl-ε-caprolactone; dimethyl-ε-caprolactone; di-n-propyl-ε-caprolactone; di-n-hexyl-ε-caprolactone; trimethyl-ε-caprolactone; triethyl-ε-caprolactone; pivalolactone; and, 5-methyloxepan-2-one.

5. The method according to claim 1, wherein said mixture comprises, based on the total weight of monomers:
from 80 to 100 wt. % of said at least one lactone monomer; and,
from 0 to 20 wt. % of at least one co-monomer selected from the group consisting of: epoxide compounds; cyclic carbonates; glycolide; and lactide.

6. The method according to claim 1, wherein said polyamine is aliphatic or cycloaliphatic.

7. The method according to claim 1, wherein said polyamine has at least two primary amine groups and at least one secondary amine group.

8. The method according to claim 1, wherein a molar ratio of lactone monomer to polyamine is in the range from 1:1 to 500:1.

9. The method according to claim 1, wherein said catalyst comprises 1,5,7-triazabicyclo[4.4.0]dec-5-ene (TBD) or 1,8-diazabicyclo-(5,4,0)-undecene-7 (DBU).

10. The method according to claim 1, wherein said catalyst is provided in an amount of from 0.1 to 5 wt. %, based on the total weight of monomers.

11. The method according to claim 1, wherein said mixture subjected to ring-opening polymerization conditions is essentially free of solvent.

12. The method according to claim 1, wherein said ring-opening polymerization conditions comprise a temperature of from 50 to 200° C.

13. An amino-functional polyester obtained by the method of claim 1 having at least one terminal hydroxy group.

14. An amino-functional polyester obtained by the method of claim 1, said polyester having at least one of:
i) a weight average molecular weight (Mw) of from 300 to 5000 g/mol;
ii) a polydispersity index of less than 2.5;
iii) an amine value (NHv) of from 20 to 350 mg KOH/g;
iv) a total hydroxyl and amine value (OHv+NHv) of from 40 to 500 mg KOH/g.

15. A curable coating, adhesive or sealant composition comprising:
  an amino functional polyester as defined in claim 14; and,
  at least one multifunctional compound (H) having at least two functional groups (F) selected from the group consisting of: epoxy groups; isocyanate groups; and cyclic carbonate groups.

\* \* \* \* \*

UNITED STATES PATENT AND TRADEMARK OFFICE
CERTIFICATE OF CORRECTION

PATENT NO. : 11,866,547 B2
APPLICATION NO. : 16/738016
DATED : January 9, 2024
INVENTOR(S) : Sonia Flores Penalba et al.

Page 1 of 1

It is certified that error appears in the above-identified patent and that said Letters Patent is hereby corrected as shown below:

In the Claims

In Claim 4:
Column 20, Line 17 change "p-propiolactone" to --β-propiolactone--.

Signed and Sealed this
Thirteenth Day of August, 2024

Katherine Kelly Vidal
*Director of the United States Patent and Trademark Office*